(12) United States Patent
Hamabe et al.

(10) Patent No.: US 11,945,142 B2
(45) Date of Patent: Apr. 2, 2024

(54) COMPOSITE RESIN MOLDED PRODUCT FOR ACOUSTIC MEMBER

(71) Applicant: Panasonic Intellectual Property Management Co., Ltd., Osaka (JP)

(72) Inventors: Masashi Hamabe, Osaka (JP); Masayoshi Imanishi, Osaka (JP); Toshifumi Nagino, Osaka (JP); Shouma Nishino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/327,859

(22) Filed: May 24, 2021

(65) Prior Publication Data

US 2021/0394407 A1    Dec. 23, 2021

(30) Foreign Application Priority Data

Jun. 17, 2020  (JP) ................................ 2020-104651

(51) Int. Cl.
*B29C 45/00*  (2006.01)
*B29B 7/00*  (2006.01)
(Continued)

(52) U.S. Cl.
CPC .......... *B29C 45/0001* (2013.01); *B29B 7/002* (2013.01); *B29C 45/0013* (2013.01);
(Continued)

(58) Field of Classification Search
CPC ...... B29C 2945/76471; B29C 44/3442; B29C 48/575; B29C 44/3473; B29C 2949/0862;
(Continued)

(56) References Cited

U.S. PATENT DOCUMENTS

| 2003/0147983 A1* | 8/2003 | Berrigan | .................. D04H 3/02 |
| | | | 425/72.2 |
| 2014/0272318 A1* | 9/2014 | Lawrence | .............. D04H 1/005 |
| | | | 442/76 |

(Continued)

FOREIGN PATENT DOCUMENTS

| CN | 102548739 | * | 7/2012 |
| JP | 4179037 B | | 11/2008 |

(Continued)

OTHER PUBLICATIONS

English Translation of Chinese Search Report dated Jan. 18, 2024 for the related Chinese Patent Application No. 202110658032.0, 2 pages.

*Primary Examiner* — Stella K Yi
(74) *Attorney, Agent, or Firm* — Wenderoth, Lind & Ponack, L.L.P.

(57) ABSTRACT

A composite resin molded product for an acoustic member is a composite resin molded product for an acoustic member containing a main agent resin and fibrous fillers dispersed in the main agent resin, and a concentration of the fibrous fillers is 50% by weight or more in the composite resin molded product, and crystallinity of the main agent resin around the fibrous fillers is higher than crystallinity of the main agent resin in other parts in the composite resin molded product.

10 Claims, 3 Drawing Sheets

(51) Int. Cl.
*B29K 23/00* (2006.01)
*B29K 511/10* (2006.01)

(52) U.S. Cl.
CPC ...... *B29K 2023/06* (2013.01); *B29K 2023/12* (2013.01); *B29K 2511/10* (2013.01)

(58) Field of Classification Search
CPC .......... B29C 2948/92714; B29C 2948/92219; B29C 66/73776; B29C 66/73775; B29C 66/73774; B29C 66/73773; B29C 66/7377; B29C 45/0013; B29C 45/0005; B29C 45/0001
See application file for complete search history.

(56) References Cited

U.S. PATENT DOCUMENTS

| | | |
|---|---|---|
| 2017/0334105 A1 | 11/2017 | Mikami et al. |
| 2018/0311870 A1* | 11/2018 | Nagino ..................... B29B 7/90 |
| 2020/0062930 A1 | 2/2020 | Manishi et al. |
| 2020/0299877 A1* | 9/2020 | You .......................... D04H 3/16 |

FOREIGN PATENT DOCUMENTS

| | | |
|---|---|---|
| JP | 2014095049 | * 11/2012 |
| JP | 2017-210595 | 11/2017 |
| JP | 2020-033541 | 3/2020 |
| JP | 2020-065164 | 4/2020 |

\* cited by examiner

(Table 1)

| | Fibrous filler | | | | Molded product | | | | Molded product quality | |
|---|---|---|---|---|---|---|---|---|---|---|
| | Type | End defib-ration | Hydro-phobizing | Fiber concent-ration | Resin crystallinity near fibers and at other parts | Resin crystallinity near tip of fibrous filler and near center of fibrous filler | Crack width near surface | Elastic modulus GPa | | Sound chara-cteristics tan δ |
| Example 1 | Cellulose (softwood) | Yes | No | 55% | Near fibers >Other parts | Near tip>Near center | 1/10 or less of filler diameter | A | 4.3GPa | A |
| Example 2 | Cellulose (softwood) | Yes | No | 70% | Near fibers >Other parts | Near tip>Near center | 1/10 or less of filler diameter | A | 5.1GPa | A |
| Example 3 | Cellulose (softwood) | No | No | 55% | Near fibers >Other parts | Near tip≒Near center | 1/10 or less of filler diameter | A | 4.0GPa | B |
| Example 4 | Cellulose (softwood) | Yes | No | 55% | Near fibers >Other parts | Near tip>Near center | 1/5 or more of filler diameter | A | 4.2GPa | B |
| Compa-rative example 1 | Cellulose (softwood) | Yes | No | 30% | Near fibers >Other parts | Near tip>Near center | 1/10 or less of filler diameter | C | 2.7GPa | D |
| Compa-rative example 2 | Cellulose (softwood) | Yes | Yes | 55% | Near fibers ≒Other parts | Near tip≒Near center | No cracks | B | 4.5GPa | D |
| Compa-rative example 3 | Cellulose (softwood) | Yes | No | 55% | Near fibers ≒Other parts | Near tip≒Near center | 1/10 or less of filler diameter | B | 4.2GPa | C |
| Compa-rative example 4 | Glass | No | No | 55% | Near fibers >Other parts | Near tip≒Near center | 1/10 or less of filler diameter | B | 6.5GPa | B |

COMPOSITE RESIN MOLDED PRODUCT FOR ACOUSTIC MEMBER

BACKGROUND

1. Technical Field

The present disclosure relates to a composite resin molded product for an acoustic member that can realize a molded product having excellent sound characteristics.

2. Description of the Related Art

So-called "general-purpose plastics" such as polyethylene (PE), polypropylene (PP), polystyrene (PS), and polyvinyl chloride (PVC) are not only very inexpensive, but also easy to mold and weigh a few times lighter than metal or ceramics. Therefore, general-purpose plastics are commonly used as a material for various daily necessities such as bags, various packages, various containers, sheets, and the like, as a material for industrial components such as automobile components, electrical components, and the like, and as a material for daily necessities, miscellaneous goods, and the like.

However, general-purpose plastics have drawbacks such as insufficient mechanical strength. Therefore, general-purpose plastics do not have sufficient properties required for materials used in mechanical products such as automobiles and various industrial products such as electrical, electronic, and information products, and the application there is limited.

On the other hand, so-called "engineering plastics" such as polycarbonate, fluororesin, acrylic resin, and polyamide have excellent mechanical properties and are used in mechanical products such as automobiles and various industrial products such as electrical, electronic, and information products. However, engineering plastics have problems such as being expensive, difficult to recycle monomers, and having a large environmental load.

Therefore, it is required to significantly improve the material properties (mechanical strength, and the like) of general-purpose plastics. For the purpose of strengthening general-purpose plastics, there is known a technique for improving the mechanical strength of general-purpose plastics by dispersing natural fibers, glass fibers, carbon fibers, and the like, which are fibrous fillers, in the resin of the general-purpose plastics. It is known that adding these fibrous fillers enhances not only the mechanical properties but also the internal loss peculiar to the material, thereby improving the sound characteristics. Among these fillers, organic fillers such as cellulose are attracting attention because the organic fillers are inexpensive and have excellent environmental friendliness at the time of disposal.

In audio equipment such as speakers, headphones, and various players, molded components used for exterior members and interior members are required to improve internal loss by improving viscosity in addition to mechanical strength for the purpose of improving sound characteristics. Each company is studying to improve the sound characteristics of composite resins. For example, a composite resin that is made of cellulose fibers and a thermoplastic resin, and contains about 35% by weight of cellulose fibers and has a cellulose fiber length of 0.5 to 1.0 mm and a fiber diameter of 50 to 60 μm has been proposed (for example, Japanese Patent No. 4179037). Excellent sound characteristics are realized by using this composite resin as a composition for molding a speaker unit mounting member.

SUMMARY

A composite resin molded product for an acoustic member according to one aspect of the present disclosure contains a main agent resin and fibrous fillers dispersed in the main agent resin. A concentration of the fibrous fillers is 50% by weight or more in the composite resin molded product. In the composite resin molded product, crystallinity of the main agent resin around the fibrous fillers is higher than crystallinity of the main agent resin at a part other than around the fibrous fillers.

BRIEF DESCRIPTION OF THE DRAWINGS

FIG. 5 is Table 1 illustrating measurement results in Exemplary Examples 1 to 4 and Comparative Examples 1 to 4.

DETAILED DESCRIPTIONS

Figure 1:
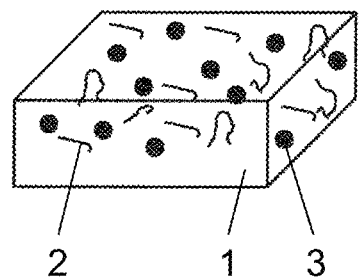
FIG. 1 is a transmission schematic view illustrating an internal configuration of a composite resin molded product according to Exemplary Embodiment 1.

In the composite resin described in Japanese Patent No. 4179037, since the moldability deteriorates when many fibers are added, more than half of the composite resin is a resin, and there is a problem that the rigidity and internal loss are not sufficiently high and the sound characteristics are not sufficient.

An object of the present disclosure is to solve the above problem and to realize a composite resin molded product for an acoustic member with improved sound characteristics.

According to a first aspect of the disclosure, there is provided a composite resin molded product for an acoustic member containing a main agent resin and fibrous fillers dispersed in the main agent resin. A concentration of the fibrous fillers is 50% by weight or more in the composite resin molded product. In the composite resin molded product, crystallinity of the main agent resin around the fibrous filler is higher than crystallinity of the main agent resin at a part other than around the fibrous filler.

In a second aspect of the composite resin molded product for an acoustic member according to the first aspect, crystallinity of the main agent resin around the tip of the fibrous filler may be higher than crystallinity of the main agent resin around the center of the fibrous filler.

In a third aspect of the composite resin molded product for an acoustic member according to the first or second aspect, there may be provided a hole or a crack on the surface of the composite resin molded product, and the width of the hole or the crack may be 1/10 or less of the diameter of the fibrous filler.

In a fourth aspect of the composite resin molded product for an acoustic member according to any one of the first to third aspects, the fibrous filler in the composite resin molded product may not be hydrophobized in advance.

In a fifth aspect of the composite resin molded product for an acoustic member according to any one of the first to fourth aspects, the fibrous filler in the composite resin molded product may be defibrated only at ends thereof.

In a sixth aspect of the composite resin molded product for an acoustic member according to any one of the first to fifth aspects, the fibrous fillers may be fibers made of natural fibers.

In a seventh aspect of the composite resin molded product for an acoustic member according to any one of the first to sixth aspects, the main agent resin may be an olefin resin.

In the composite resin molded product for an acoustic member according to the first aspect, it is possible to achieve both high elastic modulus and high internal loss in a fiber-reinforced material for an acoustic member, thereby improving the sound characteristics of the product.

Hereinafter, the composite resin molded product according to the exemplary embodiment will be described with reference to drawings. In the following description, the same configuration components are designated by the same reference numerals, and the description thereof is omitted as appropriate.

Exemplary Embodiment 1

Figure 2A:
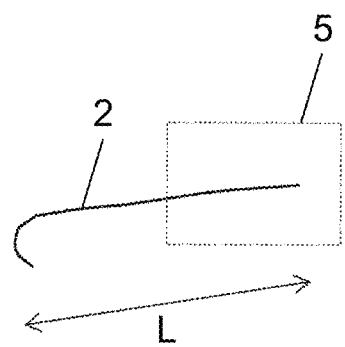
FIG. 2A is a schematic view of a fibrous filler which is a constituent member of the composite resin molded product according to Exemplary Embodiment 1.
Figure 2B:
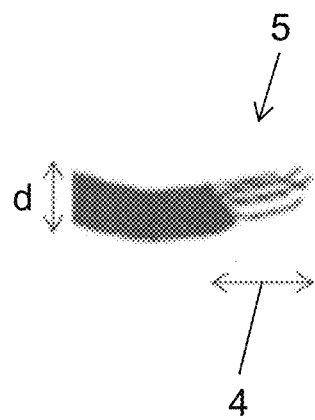
FIG. 2B is a partially enlarged view including the ends of the fibrous filler of FIG. 2A.

FIG. 1 is a transmission schematic view illustrating an internal configuration of composite resin molded product 10 according to Exemplary Embodiment 1. FIG. 2A is a schematic view of fibrous filler 2 which is a constituent member of the composite resin molded product according to Exemplary Embodiment 1. FIG. 2B is a partially enlarged view including ends 5 of the fibrous filler of FIG. 2A.

Composite resin molded product 10 according to Exemplary Embodiment 1 is made of a melt-kneaded product containing main agent resin 1, fibrous filler 2, and additive 3. In composite resin molded product 10, fibrous filler 2 and additive 3 are dispersed in main agent resin 1 as illustrated in the transmission schematic view of FIG. 1. The concentration of fibrous filler 2 is 50% by weight or more in composite resin molded product 10. In composite resin molded product 10, the crystallinity of main agent resin 1 around fibrous filler 2 is higher than the crystallinity of main agent resin 1 at a part other than around fibrous filler 2.

As a result, it is possible to achieve both high elastic modulus and high internal loss, thereby improving the sound characteristics of the product.

Main Agent Resin

In the present exemplary embodiment, main agent resin 1 is preferably a thermoplastic resin in order to ensure good moldability. Examples of the thermoplastic resin include olefin resins (including cyclic olefin resins), styrene resins, (meth) acrylic resins, organic acid vinyl ester resins or derivatives thereof, vinyl ether resins, halogen-containing resins, polycarbonate resins, polyester resins, polyamide resins, thermoplastic polyurethane resins, polysulfone-based resins (polyethersulfone, polysulfone, and the like), polyphenylene ether-based resins (polymers of 2,6-xylenol, and the like), cellulose derivatives (cellulose esters, cellulose carbamates, cellulose ethers, and the like), silicone resins (polydimethylsiloxane, polymethylphenylsiloxane, and the like), rubber or elastomer (diene rubber such as polybutadiene, polyisoprene, styrene-butadiene copolymer, acrylonitrile-butadiene copolymer, acrylic rubber, urethane rubber, silicone rubber, and the like), biomassplastics (biopolyethylene, biopolyethylene terephthalate, starch, polylactic acid, polybutylene succinate, polyhydroxyalkanoic acid, and other bio-derived resins, biodegradable resins, and the like). The above resins may be used alone or in combination of two or more. Main agent resin 1 does not have to be a thermoplastic resin as long as the resin has good moldability and is not limited to the above materials.

Among these thermoplastic resins, main agent resin 1 is preferably an olefin resin having a relatively low melting point. The olefin resin includes a homopolymer of an olefin-based monomer, a copolymer of an olefin-based monomer, and a copolymer of an olefin-based monomer and another copolymerizable monomer. Examples of the olefin-based monomer include chain olefins ($\alpha$-C2-20 olefins such as ethylene, propylene, 1-butene, isobutene, 1-pentene, 4-methyl-1-pentene, 1-octene, and the like) and cyclic olefins. These olefin-based monomers may be used alone or in combination of two or more. Among the above olefin-based monomers, chain olefins such as ethylene and propylene are preferable. Other copolymerizable monomers include, for example, fatty acid vinyl esters such as vinyl acetate and vinyl propionate, (meth)acrylic monomers such as (meth)acrylic acid, alkyl (meth)acrylate, and glycidyl (meth)acrylate, unsaturated dicarboxylic acids such as maleic acid, fumaric acid, maleic anhydride or the anhydrides thereof, vinyl ester of carboxylic acid (for example, vinyl acetate, vinyl propionate, and the like), cyclic olefins such as norbornene and cydopentadiene, and dienes such as butadiene and isoprene. These copolymerizable monomers may be used alone or in combination of two or more. Specific examples of the olefin resin include copolymers of chain olefins (especially $\alpha$-C2-4 olefins) such as polyethylene (low density, medium density, high density or linear low density polyethylene, and the like), polypropylene, ethylene-propylene copolymer, and ternary copolymer such as ethylene-propylene-butene-1.

Dispersant

Next, a dispersant will be described. The composite resin molded product according to the present exemplary embodiment contains a dispersant for the purpose of improving the adhesiveness between fibrous filler 2 and main agent resin 1 or the dispersibility of fibrous filler 2 in main agent resin 1. By improving the dispersibility, the fibers and the resin are uniformly dispersed, the vibration absorption at the interface is increased, and the sound characteristics are improved. Examples of the dispersant include various titanate-based coupling agents, silane coupling agents, unsaturated carboxylic acids, maleic acid, maleic anhydride, or modified polyolefins grafted with anhydrides, fatty acids, fatty acid metal salts, fatty acid esters, and the like. The silane coupling agent is preferably unsaturated hydrocarbon-based or epoxy-based. The surface of the dispersant may be treated with a thermosetting or thermoplastic polymer component and modified. The content of the dispersant in the composite resin molded product according to the present exemplary embodiment is preferably 0.01% by mass or more and 20% by mass or less, and more preferably 0.1% by mass or more and 10% by mass or less, much more preferably 0.5% by mass or more and 5% by mass or less. If the content of the dispersant is less than 0.01% by mass, dispersion failure occurs, while if the content of the dispersant exceeds 20% by mass, the strength of the composite resin molded product decreases. The dispersant is appropriately selected depending on the combination of main agent resin 1 and fibrous filler 2, but if not required, the dispersant may not be added in particular.

Fibrous Filler

Next, fibrous filler 2 will be described. Fibrous filler 2 (hereinafter, may be simply referred to as "fibers") contained in the composite resin molded product according to the present exemplary embodiment is used for a first main purpose of improving mechanical properties and improving dimensional stability by lowering the coefficient of linear expansion in a composite resin molded product molded by using a composite resin composition. For this purpose, fibrous filler 2 preferably has a higher elastic modulus than main agent resin 1, and specifically, includes carbon fibers, carbon nanotube, pulp, cellulose, cellulose nanofibers, lignocellulose, lignocellulose nanofibers, basic magnesium sulfate fibers (magnesium oxysulfate fibers), potassium titanate fibers, aluminum borate fibers, calcium silicate fibers, calcium carbonate fibers, silicon carbide fibers, wollastonite, zonotrite, various metal fibers, natural fibers such as cotton, silk, wool or hemp, jute fibers, recycled fibers such as rayon or cupra, semi-synthetic fibers such as acetate and promix, synthetic fibers such as polyester, polyacrylonitrile, polyamide, aramid, polyolefin, and the like, modified fibers having chemically modified surfaces and terminals. Among these, carbons and celluloses are particularly preferable from the viewpoints of availability, high elastic modulus, and low coefficient of linear expansion.

The second purpose of adding fibrous filler 2 is to improve the sound characteristics. That is, the viscosity is improved. For this purpose, the fibrous filler preferably has some flexibility, and pulp, cellulose, cellulose nanofibers, lignocellulose, lignocellulose nanofibers, natural fibers such as cotton, silk, wool or hemp, jute fibers, recycled fibers such as rayon or cupra are preferable. Fibers with flexibility other than the above can also be used for this purpose. Fibrous filler 2 is not limited to the above materials as long as the filler can improve mechanical properties and has flexibility.

Next, the form near the interface between fibrous filler 2 and main agent resin 1 will be described. In order to improve the sound characteristics, that is, to improve the internal loss, it is necessary to convert the vibration into heat energy, and in the composite resin, the internal loss is improved by the frictional heat generated by the vibration at the interface between the fibrous filler and the resin. For this purpose, as described above, the fibrous filler has flexibility so that the filler can be easily converted into heat energy and internal loss is improved. It is preferable that the crystallinity of main agent resin 1 around fibrous filler 2 is higher than the crystallinity of main agent resin 1 at a part other than around fibrous filler 2. Further, by controlling the crystal state of the resin around fibrous filler 2, the internal loss can be further improved. As illustrated in the partially enlarged view including ends 5 of the fibrous filler in FIG. 2B, it is possible to obtain a structure satisfying the above by defibrating only ends 5 of the fibrous filler. With such a structure, the crystallinity near the tip of the fibrous filler can be made higher than that near the center. The higher the shearing force during kneading, the higher the defibration, and the higher the defibration, the higher the crystallinity. The difference in crystallinity creates a difference in the strength of the resin and creates an interface. Due to the created interface, vibration can be absorbed at the interface and internal loss can be improved. The tip defibration portion is preferably 5% or more and 50% or less of fiber length L of entire fibrous filler 2. If the defibration portion is less than 5% of entire fiber length L, the crystallinity does not increase because the specific surface area is small, and if the defibration portion is 50% or more, the interface does not increase due to the difference in crystallinity, and the sound characteristics deteriorate in either case. In the vicinity of the center of the fibers, because there are some parts that are in close contact with the resin and some parts that are not, the crystallinity in the parts that are in close contact with the resin is higher than the crystallinity in the parts that are not, and the internal loss can be improved by increasing the number of interfaces. Such a structure can be realized by kneading the fibrous filler in advance without hydrophobizing. By using fibers with defibrated tips, the center is not defibrated and the surface area does not increase so much, and therefore the resin does not thicken, the fluidity is maintained even if the concentration is increased, and the moldability can be improved.

Next, the state of existence of the fibrous filler in the composite resin molded product will be described. Depending on the molding conditions, the fibrous filler can be segregated in the vicinity of the surface of the molded product. When a natural material is used as the fibrous filler, the fibers have minute voids. Therefore, by segregating the fibrous filler in the vicinity of the molded product, minute voids can exist on the surface of the molded product. As described above, since the fibrous filler is not hydrophobized in advance, the main agent resin and the fibrous filler do not blend with each other, and due to the difference in heat shrinkage during molding, a minute gap can be allowed between the main agent resin and the fibrous filler. The gap can also be segregated on the surface of the molded product by molding. By having minute holes or cracks on the surface of the molded product in this way, the sound absorption characteristics can be enhanced and the sound characteristics can be improved by the principle of Helmholtz resonance such as a perforated plate wall.

Figure 3A:
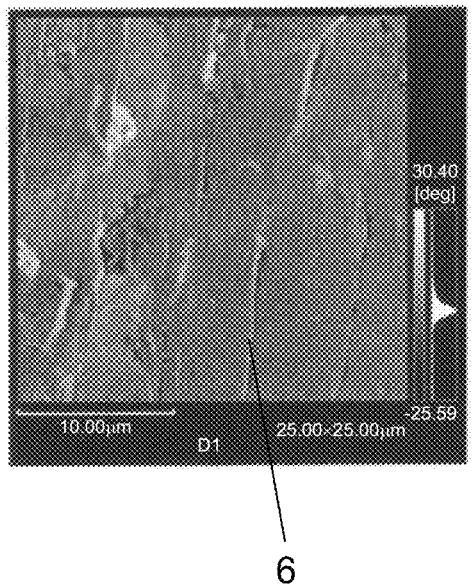
FIG. 3A is a phase image 2D display of a surface AFM image of the composite resin molded product according to Exemplary Embodiment 1.
Figure 3B:
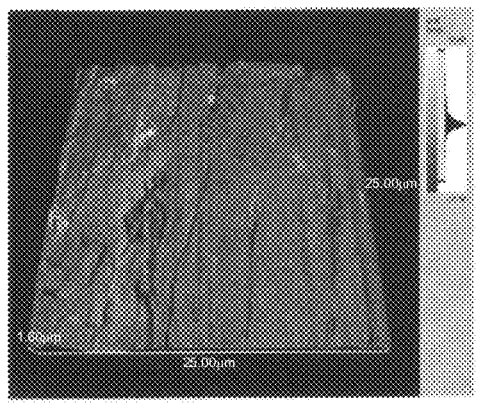
FIG. 3B is a superposition display of a 3D image and a phase image of the composite resin molded product according to Exemplary Embodiment 1.

FIG. 3A is a phase image 2D display of a surface atomic force microscope (AFM) image of the composite resin molded product according to Exemplary Embodiment 1. FIG. 3B is a superposition display of a 3D image and the phase image.

As illustrated in FIG. 3A, the composite resin molded product has minute holes and cracks 6 in the vicinity of the surface. The sound characteristics can be further improved by controlling the widths of the minute holes and cracks 6 in the vicinity of the surface of the composite resin molded product. It is desirable that the width of the short side of hole and crack 6 is $\frac{1}{10}$ or less of the diameter of the fibrous filler. The upper limit of the width of the short side of hole and crack 6 has been found by simulation, and if the width is larger than $\frac{1}{10}$ of the filler diameter, resonance is unlikely to occur inside the hole, and the sound characteristics are not sufficiently improved. Therefore, it is desirable that the width is $\frac{1}{10}$ or less of the diameter of the fibrous filler. Such cracks 6 can be controlled by the original fiber state, the difference in heat shrinkage between the resin and the fibers, and the molding conditions.

When the pellet of the composite resin composition used for manufacturing a composite resin molded product is applied to a primary exterior member such as an exterior body of a speaker, the composite resin composition containing a fibrous filler is required to have colorability. In order to have colorability as a composite resin composition, it is necessary to maintain the whiteness of the composite resin composition, and it is necessary to maintain the whiteness of the fibrous filler to be added. The L value is preferably high by measuring the color difference of the fibrous filler, and the L value is preferably 85 or more by experimentally calculating the L value (brightness) of the fibrous filler with the improved degree of coloring of the molded product in the Lab color system.

Next, the characteristics of fibrous filler 2 will be described. The types of main agent resin 1 and fibrous filler 2 are as described above. However, if fibrous filler 2 is too soft with respect to main agent resin 1, that is, the elastic modulus is small, the elastic modulus of the composite resin composition and the composite resin molded product after molding is reduced as a whole, and as a result, the strength is reduced. On the other hand, if fibrous filler 2 is too hard with respect to main agent resin 1, that is, if the elastic modulus is large, the sound is not sufficiently attenuated when the vibration is attenuated, and the sound characteristics deteriorate. Therefore, as for the relationship between the elastic moduli of main agent resin 1 and fibrous filler 2, it is preferable that the elastic modulus of fibrous filler 2 is higher and the difference is as small as possible. The optimum relationship is calculated from the simulation results, and the difference in elastic modulus between main agent resin 1 and fibrous filler 2 is preferably within 20 GPa.

The fibrous filler is present in the composite resin molded product in an amount of 50% by weight or more. As a result, it is possible to realize excellent sound characteristics and high elastic modulus.

Manufacturing Method of Composite Resin Molded Product

Figure 4:
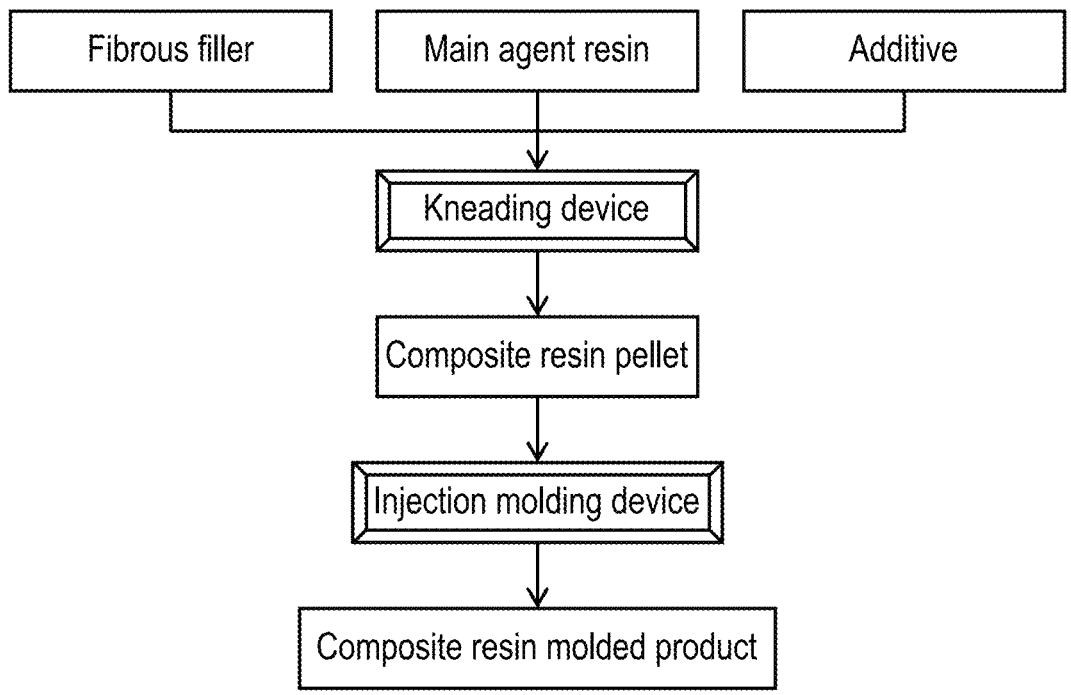
FIG. 4 is a schematic view of a manufacturing process of the composite resin molded product according to Exemplary Embodiment 1.

Next, a method for manufacturing a composite resin molded product will be described. FIG. 4 is a flowchart illustrating the manufacturing process of the composite resin molded product according to Exemplary Embodiment 1.

(1) A main agent resin, a fibrous filler, and an additive are put into a melt-kneading treatment device and melt-kneaded in the device. As a result, the main agent resin is melted, and the fibrous filler and the additive are dispersed in the melted main agent resin. At the same time, the shearing action of the device promotes the defibration of the agglomerates of the fibrous filler, and the fibrous filler can be finely dispersed in the main agent resin. The ends of the fibrous filler at this time is also defibrated.

In a related art, as the fibrous filler, a filler in which the fibers are defibrated in advance by pretreatment such as wet dispersion has been used. However, if the fibrous filler is defibrated in advance in the solvent used for wet dispersion, the fibrous filler is easily defibrated than in the molten main agent resin, and therefore the fibrous filler is hardly defibrated only at the ends, and the entire fibrous filler is in a defibrated state. There is a problem that the number of steps is increased by combining the pretreatment and the productivity is deteriorated.

On the other hand, in the manufacturing process of the composite resin molded product in the present exemplary embodiment, the melt-kneading treatment (all-dry method) is performed together with the main agent resin and the dispersant without performing the pretreatment by wet dispersion for the purpose of defibrating the fibrous filler. In this method, by not performing the wet dispersion treatment of the fibrous filler, the fibrous filler can be partially defibrated only at the ends as described above, the number of steps is reduced, and the productivity is improved.

In order to produce the fibrous filler of the present exemplary embodiment by the all-dry method, it is preferable to apply a high shear stress at the time of kneading, and specific kneading methods include a single-screw kneader, a twin-screw kneader, a roll kneader, a Banbury mixer, and a combination thereof. From the viewpoint of easy application of high shear and high mass productivity, a continuous twin-screw kneader and a continuous roll kneader are particularly preferable. A kneading method other than the above may be used as long as the method can apply a high shear stress.

(2) The composite resin composition extruded from the melt-kneading device is produced into a pellet shape through a cutting step such as a pelletizer. As a method for pelletizing, there are an aerial hot cut method, an underwater hot cut method, a strand cut method, and the like as a method to be performed immediately after the resin is melted, or there is also a crushing method in which a molded product or sheet is once molded and then crushed or cut.

(3) With injection molding of these pellets, an injection-molded product as a composite resin molded product can be produced. By mixing the fibrous fillers in the pellets as described above, an injection-molded product having excellent elastic modulus, impact resistance, and appearance can be obtained.

Hereinafter, each example and each comparative example in the experiments conducted by the inventors will be described.

Example 1

In Example 1, a pulp-dispersed polypropylene composite resin molded product was manufactured by the following manufacturing method.

(1) Softwood pulp (trade name: NBKP Celgar, manufactured by Mitsubishi Paper Mills Limited) was used as a starting material for the fibrous filler. This softwood pulp was crushed with a crusher to obtain a fibrous filler. The defibration at the ends was adjusted in the crushing process.

(2) A mixture of polypropylene (trade name: J108M manufactured by Prime Polymer Co., Ltd.) as the main agent resin, the above fibrous filler, and maleic anhydride (trade name: UMEX manufactured by Sanyo Chemical Industries, Ltd.) as an additive were weighed so that the weight ratio of the main agent resin, the fibrous filler, and the additive was 42.9:55.0:2.1, and dry-blended.

(3) Thereafter, the mixture was melt-kneaded and dispersed by a twin-screw kneader (KRC kneader manufactured by Kurimoto Iron Works Co., Ltd.). The shearing force can be changed by changing the screw configuration of the twin-screw kneader, and in Example 1, the specifications were set to the medium shear type. The resin melt material was hot-cut to produce pulp-dispersed polypropylene pellets.

(4) By using the produced pulp-dispersed polypropylene pellets, a test piece of a composite resin molded product was produced by an injection molding machine (180AD manufactured by Japan Steel Works, Ltd.). The preparation conditions for the test piece were a resin temperature of 190° C., a mold temperature of 60° C., an injection speed of 60 mm/s, and a holding pressure of 80 Pa. The shape of the test piece was changed according to the evaluation items described below, and a No. 1-sized dumbbell was produced for measuring the elastic modulus, and a 60 mm square, 1.6 mm thick flat plate was produced for measuring hydrophilicity. The obtained pulp-dispersed polypropylene composite resin molded product test piece was evaluated by the following method.

Defibration of Fiber Ends

The obtained pulp-dispersed polypropylene pellets were immersed in a xylene solvent to dissolve polypropylene, and the shape of the remaining pulp fibers was observed by SEM. The ends of the fibers were in a defibrated state.

Elastic Modulus of Composite Resin Molded Product

A tensile test was carried out by using the obtained No. 1 dumbbell-shaped test piece. Here, as a method for evaluating the elastic modulus, a numerical value of less than 3.0 GPa was designated as C, a numerical value of 3.0 GPa or more and less than 4.0 GPa was designated as B, and a numerical value of 4.0 GPa or more was designated as A. The elastic modulus of the test piece was 4.3 GPa, and the evaluation was A.

Evaluation of Sound Characteristics of Composite Resin Molded Product

By using the obtained test piece, the sound characteristics were evaluated from the viscoelasticity test evaluation. Specifically, tan δ linked to the sound absorption characteristics was calculated from the viscoelasticity measurement results, and the sound vibration absorption was evaluated. A simple speaker housing was created, sound is generated inside, and a sensory evaluation is carried out by humans. In the sensory evaluation, it was confirmed that the larger the tan δ, the better the sound without being mixed, and the smaller the tan δ, the more the previous sound remains, and the worse the sound mixed with noise. In terms of sound vibration absorption, those smaller than tan δ of a current resin speaker by 0.05 or more were evaluated as D, those within ±0.05 of tan δ of the current resin speaker were evaluated as C, those larger than tan δ of the current resin speaker by 0.05 or more were evaluated as B, and those larger than the current resin speaker tan δ by 0.1 or more were evaluated as A. The evaluation result of the sound characteristics of the test piece was A.

Example 2

In Example 2, the concentration of the fibrous filler was changed to 70% by weight, the concentration of the main agent resin was changed to 27.9% by weight, and other material conditions and process conditions were the same as in Example 1 to produce pulp-dispersed polypropylene pellets and a molded product. As for the evaluation, the same evaluation as in Example 1 was carried out.

Example 3

In Example 3, pulp-dispersed polypropylene pellets and a molded product were produced in the same manner as in Example 1 except that the number of revolutions during kneading was reduced and the shearing force was low so that the fibrous filler was not defibrated at the ends. As for the evaluation, the same evaluation as in Example 1 was carried out.

Example 4

In Example 4, pulp-dispersed polypropylene pellets and a molded product were produced in the same manner as in Example 1 except that the pre-crushing conditions for pulp, which is a fibrous filler, were changed so that the cracks caused by the pulp in the molded product became larger. As for the evaluation, the same evaluation as in Example 1 was carried out.

Comparative Example 1

In Comparative Example 1, the concentration of the fibrous filler was changed to 30% by weight, the concentration of the main agent resin was changed to 67.9% by weight, and other material conditions and process conditions were the same as in Example 1 to produce pulp-dispersed polypropylene pellets and a molded product. As for the evaluation, the same evaluation as in Example 1 was carried out.

Comparative Example 2

In Comparative Example 2, the starting material pulp was previously hydrophobized with a silane coupling agent, and other material conditions and process conditions were the same in Example 1 to produce pulp-dispersed polypropylene pellets and a molded product. As for the evaluation, the same evaluation as in Example 1 was carried out.

Comparative Example 3

In Comparative Example 3, the molding conditions were changed so that the cooling is extremely slow, the crystallinity of the resin near the fibrous filler and the crystallinity other than that are almost the same, and the crystallinity of the resin around the tip and near the center of the fibrous filler is also almost the same. Other than that, pulp-dispersed polypropylene pellets and a molded product were produced in the same manner as in Example 1. As for the evaluation, the same evaluation as in Example 1 was carried out.

Comparative Example 4

In Comparative Example 4, pulp-dispersed polypropylene pellets and a molded product were produced in the same manner as in Example 1 except that short glass fibers were used as the fibrous filler. As for the evaluation, the same evaluation as in Example 1 was carried out.

The measurement results in Examples 1 to 4 and Comparative Examples 1 to 4 are illustrated in Table 1 of FIG. 5.

As is clear from Table 1 of FIG. 5, in Example 2 in which the concentration of the fibrous filler was changed to 70% by weight, the elastic modulus increased as the concentration increased, but it was confirmed that the way the resin crystals were formed and the cracks on the surface of the molded product were the same as in Example 1, and the sound characteristics were also good. The fibrous filler is defibrated at the ends and is not hydrophobized in advance, and the crystallinity near the fibrous filler is higher than the crystallinity at parts other than near the fibrous filler. Also, as for the crystallinity near the fibrous filler, the crystallinity near the tip is higher than the crystallinity near the center of the fibrous filler. When the crack width near the surface of the molded product is ¹⁄₁₀ or less of the filler diameter, it was confirmed that a composite resin having a high elastic modulus and good sound characteristics can be obtained.

In Example 3 under the condition that the fibrous filler is not defibrated at the ends, as for the crystallinity near the fibrous filler, since the crystallinity near the tip was almost the same as the crystallinity near the center of the fibrous filler, and the interface with a difference in elastic modulus was reduced, the sound characteristics were not as good as those in Example 1.

In Example 4 in which the cracks due to the pulp were increased when the molded product became large, the sound absorption deteriorated, and the sound characteristics were not as good as those in Example 1.

In Comparative Example 1 in which the concentration of the fibrous filler was 30% by weight, the elastic modulus was low and the sound characteristics were also poor.

In Comparative Example 2 in which the pulp as the starting material was previously hydrophobized, the crystallinity near the fibrous filler is almost the same as the crystallinity at parts other than near the fibrous filler, and also, as for the crystallinity near the fibrous filler, the crystallinity near the tip was almost the same as the crystallinity near the center of the fibrous filler. The resin and the fibrous filler were well-blended, and there were no cracks on the surface of the molded product. As a result, the sound characteristics were deteriorated.

In Comparative Example 3 in which the crystallinity of the resin near the fibrous filler and the crystallinity of other parts are almost the same, and the crystallinity of the resin around the tip and near the center of the fibrous filler was almost the same, the sound characteristics were slightly deteriorated.

In Comparative Example 4 in which short glass fibers were used as the fibrous filler, the elastic modulus was considerably high, but the sound absorption was poor, and the sound characteristics were not as good as those in Example 1.

From the above evaluation, the fibrous filler is 50% by weight or more, the fibrous filler is defibrated at the ends and is not hydrophobized in advance, and the crystallinity near the fibrous filler is higher than the crystallinity at parts other than near the fibrous filler. Also, as for the crystallinity near the fibrous filler, the crystallinity near the tip is higher than the crystallinity near the center of the fibrous filler. When the crack width near the surface of the molded product is $1/10$ or less of the filler diameter, it was confirmed that a composite resin molded product having a high elastic modulus and good sound characteristics can be obtained.

The present disclosure includes the appropriate combination of any exemplary embodiments and/or examples among the various exemplary embodiments and/or examples described above, and the effects of each exemplary embodiment and/or example can be achieved.

The composite resin molded product for an acoustic member according to the present disclosure can provide a molded product having superior mechanical strength and sound characteristics as compared with general-purpose resins in a related art. Since the composite resin molded product for an acoustic member according to the present disclosure can improve the sound characteristics of the main agent resin, the composite resin molded product can be used as an acoustic member such as a speaker, an electronic device that emits sound, a housing member such as a home appliance, a substitute for engineering plastics, or a substitute for a metal material. Further, the composite resin molded product can be used for building materials and automobile members.

What is claimed is:

1. A composite resin molded product for an acoustic member, the composite resin molded product comprising:
    a main agent resin that is a thermoplastic resin selected from the group consisting of olefin resins, styrene resins, organic acid vinyl ester resins or derivatives thereof, vinyl ether resins, halogen-containing resins, polycarbonate resins, polyamide resins, thermoplastic polyurethane resins, polysulfone-based resins, polyphenylene ether-based resins, cellulose esters resins, cellulose carbamates resins, cellulose ethers resins, polydimethylsiloxane resins, polymethylphenylsiloxane resins, diene rubber or elastomer resins, and biomass plastics resins; and
    fibrous fillers dispersed in the main agent resin; and
    a dispersant for improving adhesiveness between the fibrous fillers and the main agent resin, wherein
    a concentration of the fibrous fillers is 50% by weight or more in the composite resin molded product,
    in the composite resin molded product, crystallinity of the main agent resin at first parts around the fibrous fillers is higher than crystallinity of the main agent resin at a second part other than the first parts, the second part being between the fibrous fillers,
    a content of the dispersant is 0.01% by mass or more and 20% by mass or less in the composite resin molded product,
    wherein a surface of the composite resin molded product has a hole or a crack, and a width of the hole or the crack is $1/10$ or less of a diameter of each of the fibrous fillers, and
    wherein the fibrous filler in the composite resin molded product is not hydrophobized in advance.

2. The composite resin molded product for an acoustic member of claim 1, wherein in the composite resin molded product, crystallinity of the main agent resin around a tip of each of the fibrous fillers is higher than crystallinity of the main agent resin around a center of the fibrous filler.

3. The composite resin molded product for an acoustic member of claim 1, wherein each of the fibrous fillers in the composite resin molded product is defibrated only at ends of the fibrous filler.

4. The composite resin molded product for an acoustic member of claim 1, wherein the fibrous fillers are fibers made of natural fibers.

5. The composite resin molded product for an acoustic member of claim 1, wherein the main agent resin is an olefin resin.

6. The composite resin molded product for an acoustic member of claim 5, crystallinity of the olefin resin at the first parts around the fibrous fillers is higher than crystallinity of the olefin resin at the second part other than the first parts, the second part being between the fibrous fillers.

7. The composite resin molded product for an acoustic member of claim 6, wherein crystallinity of the olefin resin around the tip of each of the fibrous fillers is higher than crystallinity of the olefin resin around the center of the fibrous filler.

8. The composite resin molded product of claim 1, wherein the content of the dispersant is 0.1% by mass or more and 10% by mass or less in the composite resin molded product.

9. The composite resin molded product of claim 1, wherein the content of the dispersant is 0.5% by mass or more and 5% by mass or less in the composite resin molded product.

10. The composite resin molded product of claim 1, wherein a difference in elastic modulus between the main agent resin and the fibrous filler is within 20 GPa.

* * * * *